July 18, 1967 P. WHITE 3,331,310
COOKING APPARATUS
Filed April 9, 1964 3 Sheets-Sheet 2

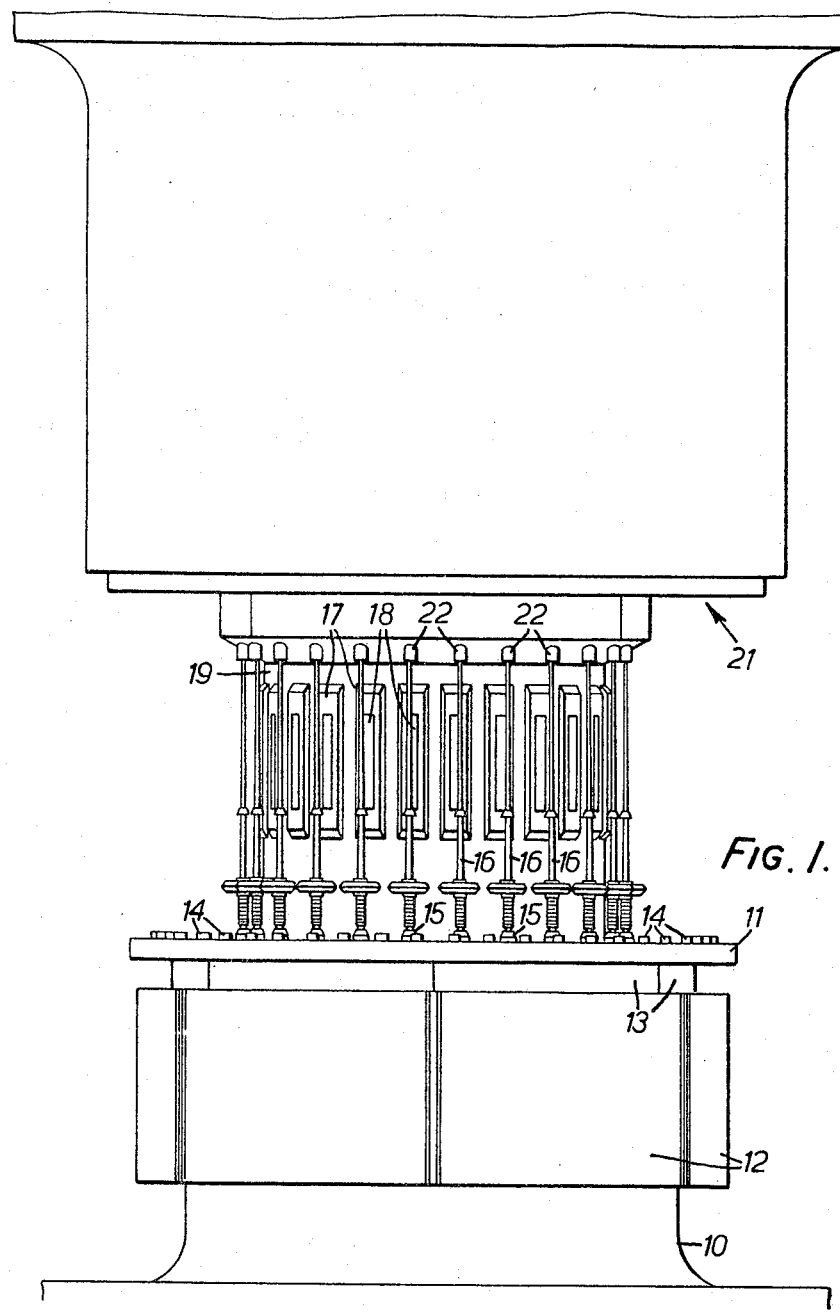

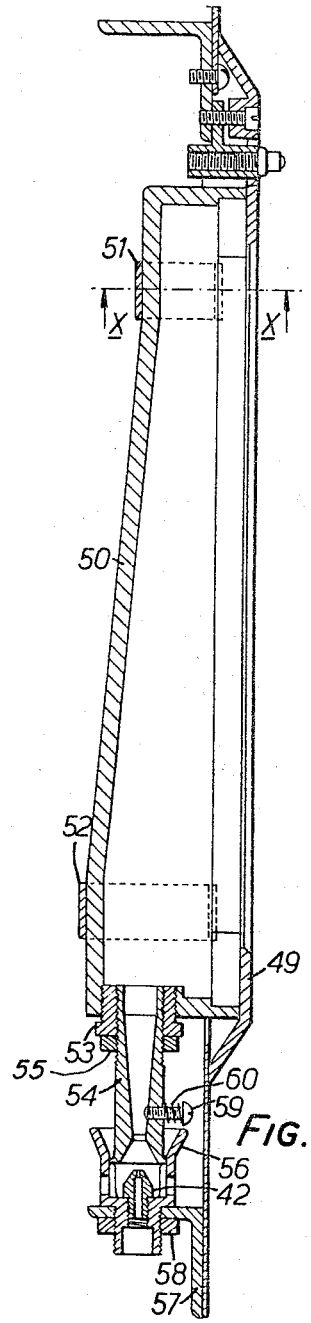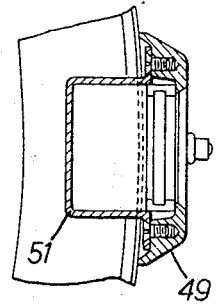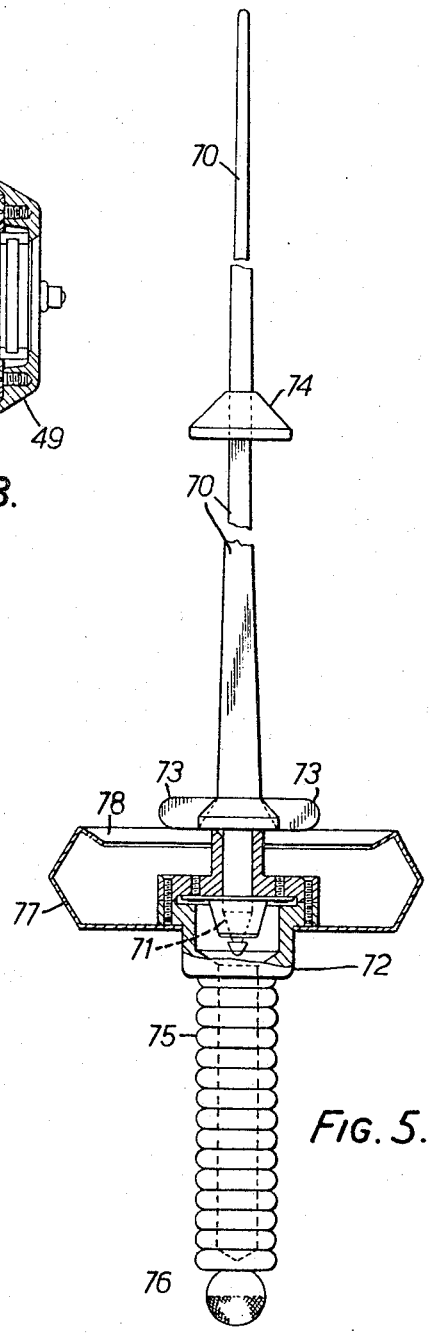

United States Patent Office 3,331,310
Patented July 18, 1967

3,331,310
COOKING APPARATUS
Percy White, London, England, assignor to
J. Lyons and Company Limited
Filed Apr. 9, 1964, Ser. No. 358,566
2 Claims. (Cl. 99—421)

The present invention relates to cooking apparatus and in particular to apparatus for grilling brochettes or collections of fish or meat portions on swords or sword-like supports.

The invention provides a multi-position grilling device equipped at each grilling position with means for rotating a brochette for a predetermined period of time and indicating when such time has elapsed. Each grilling heater is automatically brought into operation when the brochette support or carrier, hereinafter referred to as a sword, is placed in position and a motor turns the sword for a timed period of cooking. At the end of such period a green light is energised to indicate that the brochette is cooked and after a further period a red light is energised to indicate that the brochette is overcooked and unfit to be served. Each sword is equipped with a detachable handle part of which serves as a collector for fat and or juices which may drip from the brochette during cooking.

Figure 4:
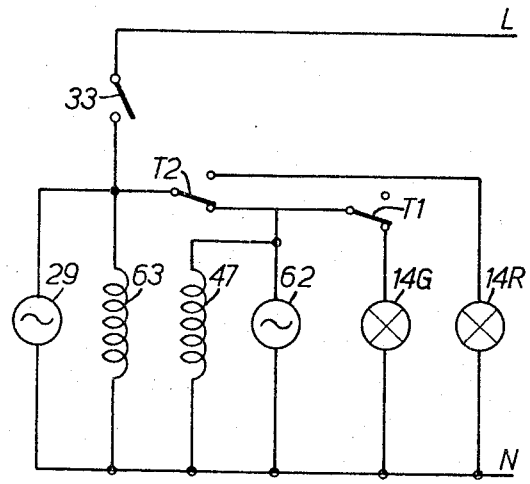
Figure 2:
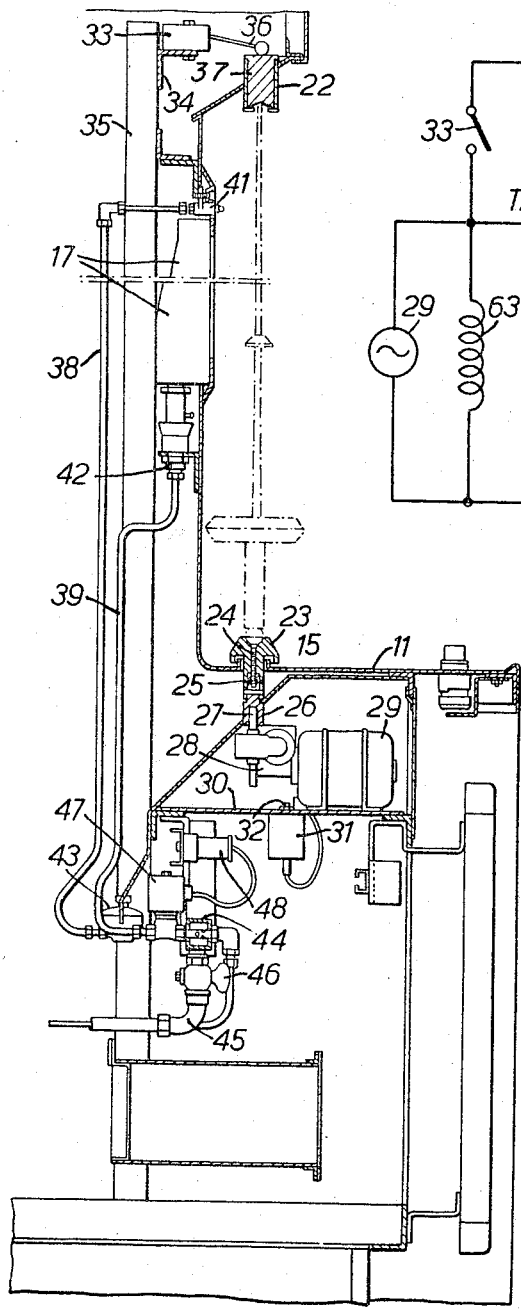

The various features and advantages of the invention will be apparent from the following description taken with reference to the accompanying drawings in which:

FIGURE 1 is a side view of a complete apparatus embodying the invention,

FIGURE 2 is a view partly in section through one cooking position of the apparatus of FIGURE 1, FIGURE 3A is a longitudinal sectional view of the burner arrangements of the position of FIGURE 2, FIGURE 3B is a transverse section along the line X—X of FIGURE 3A, FIGURE 4 is an electrical circuit diagram of the control arrangements of the apparatus of FIGURE 1, and FIGURE 5 is a view of a sword-like brochette carrier used in such apparatus.

Referring particularly to FIGURE 1, the machine comprises a support base 10 on which a table 11 is supported, the base being encased by fixed panels 12 and removable panels 13 which latter provide access to the motors and electric wiring housed beneath table 11. Around the top surface of table 11 are arranged signal lamps 14 and support cups 15 for the handles of swords 16 some of which are shown mounted in position in FIGURE 1 for convenience of illustration but which normally would not be so mounted except to grill brochettes mounted on such swords. The machine has twenty-four such support cups 15 equally spaced around the table 11 and two signal lamps, one giving a green signal and the other giving a red signal, for each support cup.

Inside the ring of cups 15 is a central column 19 housing twenty-four gas burners 17 arranged to provide long narrow grilling apertures 18 immediately above the support cups 15. The column 19 is capped by a decorative headpiece 21 and around the junction of column 19 and headpiece 21 are arranged twenty-four shrouds 22 containing spring biased push rods, each shroud 22 being arranged vertically above a support cup 15 to receive the point of a sword mounted in the support cup.

Each cup 15 is arranged to be driven in rotation by an individual electric motor mounted beneath the table 11 and the arrangement and the control of such motors and of the gas burners will now be described with reference to FIGURES 2 and 3A and 3B.

FIGURE 2 is a vertical section through the support cup 15 and shroud 22 at one cooking position with the associated motor and burner shown in full. The cup 15 comprises a head member 23 secured longitudinally by a screw 24 and transversely by a roll pin 25 to a spindle extension piece 26 secured by grub screws (not shown) to the output spindle 27 of a speed reduction gear unit 28.

Unit 28, which may be of any conventional construction is driven by an electric motor 29 mounted on a bracket 30 beneath table 11. A start capacitor 31 for motor 29 is secured to the underside of bracket 30 by a nut and bolt 32. As will later be described in connection with FIGURE 4, the energisation of motor 29 is controlled by a limit switch 33 mounted on a support bracket 34 secured to a frame member 35 of the central column 19. The roller arm 36 of switch 33 is arranged to be engaged by a push rod 37 slidably mounted in shroud 22 so that when the point of a sword 16 is inserted into shroud 22 sufficiently to accommodate the base of the sword handle in cup 15 the limit switch 33 is operated to its ON state.

Disposed interiorly of the frame member 35 are two gas supply pipes 38 and 39 of which 38 supplies a pilot jet 41 at the upper end of gas burner 17 and 39 supplies a main jet 42 of the gas burner. Pipe 38 is supplied through a pilot valve 43 from a manifold 44 supplying four cooking positions from a main supply pipe 45 through a control cock 46. Pipe 39 is supplied from the same manifold 44 through a magnetic valve 47 the control winding of which is connected to the control circuitry of FIGURE 4 through a plug and socket connector 48.

The gas burner 17 is a tubular element 50 of rectangular section masked over its front face by a mask 49 to provide the long narrow aperture 18 and held in position by upper and lower saddles 51 and 52. At its lower end the element receives a reducing bush 53 in which fits a threaded end of a Venturi tube 54 having a nut 55 abutting the bush 53. Venturi 54 fits at its other end in a cup 56 housing the main jet 42, the assembly of jet, cup, and Venturi being clamped to a support bracket 57 by a nut 58 threaded on to the tail of cup 56. A regulating screw 59 surrounded by a spiral spring 60 is provided in the wall of Venturi 54.

A longitudinal section of the burner 17 is shown in FIGURE 3A and a transverse section at X—X is shown in FIGURE 3B.

Referring now to FIGURE 4, the electrical control circuit controlled by limit switch 33 of each cooking position comprises a timer motor 62, a timer clutch winding 63 the magnetic valve 47 of the main gas jet, timer contacts T1 and T2, the red and green indicator lamps 14R and 14G and the motor 29.

The timer for each cooking position is of conventional motor driven type having an electrically energised clutch and an electric motor and arranged to close a number of contacts in timed sequence and to reset to zero upon deenergisation of its clutch.

Upon inserting a sword point into a shroud 22 and thus operating the associated limit switch 33 the contacts of switch 33 close to complete an energising circuit for the support cup driving motor 29, the timer clutch operating winding 63 and, over contacts T2 in the position shown, the timer motor 62 and the control winding of the magnetic gas valve 47 of the main gas jet. Thus the cup driving motor is set into operation, the timer begins to time the cooking period and the gas supply to the main jet is turned on and the burner ignited by its pilot jet. At the end of the cooking period the timer changes over contacts T1 to energise the green indicator lamp 14G the other functions remaining as before. Thus an indication is given that the brochette on the inserted sword has been cooked. After a further interval the timer changes over its contacts T2 to interrupt the circuit of lamp 14G and complete the circuit for the red lamp 14R and also to remove energisation from the magnetic valve 47 to cut off the main gas supply to the burner and from the timer motor 62. The cup driving motor 29 continues to operate until the sword is removed from its position to permit limit switch 33 to restore to its OFF position. This removes energisation from motor 29 and also from timer clutch winding 63 thus resetting the timer.

The construction of the individual swords is shown in FIGURE 5. Each comprises a tempered steel blade 70 welded to the head of a stainless steel pin 71 by means of which the blade is releasably secured in the sword handle 72. Stainless steel wings 73 are welded to the head of pin 71 and a mild steel boss 74 of truncated cone form is welded at a point between the ends of blade 70 corresponding to the lower edge of the grilling aperture 18 when the sword is in position between cup 15 and shroud 22. The handle 72 comprises a hollow brass stock 75 to receive the pin 71, terminating in a sphere 76 at one end and having a spun brass drip cup 77 welded to a boss formed at its other end. The cup 77 has an inturned lip 78 to prevent the contents being accidentally spilled when the blade is being removed.

I claim:

1. Automatic brochette grilling apparatus comprising a support structure presenting a plurality of grilling stations, and at each grilling station, spaced apart vertically receiving members for opposite ends of a sword-like brochette carrier, an elongated intermittently operable gas burning heating source disposed with its vertical length between said receiving members, drive means operatively connected to one of said receiving members to drive such member and the carrier received therein in rotation about an axis generally parallel to said heat source, magnetic valve means operative to control the supply of fuel gas to said heating source to render it alternatively operative and non-operative, switch means responsive to the insertion of an end of one said carrier into one of said receiving means to complete circuits for the energisation of said magnetic valve means to render said heating source operative and said drive means to cause rotation of said carrier, a respective timer means having first and second contacts and an electric motor for operating said contacts in timed sequence so that said first contacts are closed at the end of a first timing period equal to the time necessary to cook a brochette carried by said carrier and said second contacts are closed at the end of a second timing period equal to the time of cooking which renders said brochette overcooked and unfit for serving, a first indicator lamp means having an energizing circuit which includes said first contacts, a second indicator lamp means having an energizing circuit which includes said second contacts in one position thereof, said magnetic valve means and said timer motor both having energizing circuits which include said second contacts in a second position thereof in series with said switch means whereby upon insertion of a carrier between said receiving members the energization circuits of said carrier drive means, said magnetic valve means and said timer motor are energized to cause rotation of said drive means, to cause operation of said heating source and to initiate a timing operation of said timer means, and whereby subsequently, at the end of said first timing period, said first contacts close the energizing circuit of said first indicator lamp means, and at the end of said second timing period said second contacts interrupt energization of said timer motor and of said magnetic valve means to stop operation of said heating source and complete the energizing circuit of said second indicator lamp means.

2. Automatic grilling apparatus according to claim 1 wherein said carrier comprises a sword having a blade, a boss secured to said blade at a point intermediate its ends corresponding to one end of said heating source when said carrier is mounted between said receiving members, a handle readily detachably secured to said handle and a drip cup secured to said handle at its point of juncture with said blade.

References Cited

UNITED STATES PATENTS

| | | | |
|---|---|---|---|
| 2,049,481 | 8/1936 | Walterspiel | 99—421 |
| 2,687,080 | 8/1954 | Dorin | 99—421 X |
| 2,821,903 | 2/1958 | Allen et al. | 99—237 |
| 2,821,905 | 2/1958 | Culligan | 99—421 |
| 2,896,527 | 7/1959 | Richman et al. | 99—237 X |
| 3,108,532 | 10/1963 | Ray et al. | 99—331 X |
| 3,242,849 | 3/1966 | Wells | 99—416 X |

FOREIGN PATENTS 554,483   1/1957   Belgium.

WILLIAM I. PRICE, *Primary Examiner.*